(12) United States Patent
Ahlgren et al.

(10) Patent No.: US 9,008,614 B2
(45) Date of Patent: Apr. 14, 2015

(54) METHOD, DEVICE AND COMPUTER PROGRAM PRODUCT FOR CONTROLLING USE OF ELECTRONIC COMMUNICATION SERVICES

(75) Inventors: Petter Ahlgren, Ronneby (SE); Robert Törnkvist, Karlshamn (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 17 days.

(21) Appl. No.: 13/996,611

(22) PCT Filed: Dec. 29, 2011

(86) PCT No.: PCT/EP2011/074268
§ 371 (c)(1),
(2), (4) Date: Jun. 21, 2013

(87) PCT Pub. No.: WO2012/089825
PCT Pub. Date: Jul. 5, 2012

(65) Prior Publication Data
US 2013/0281053 A1    Oct. 24, 2013

(30) Foreign Application Priority Data
Dec. 30, 2010   (EP) .................................... 10197386

(51) Int. Cl.
*H04M 11/00*   (2006.01)
*H04W 4/26*    (2009.01)
(Continued)

(52) U.S. Cl.
CPC ............ *H04W 4/26* (2013.01); *H04L 12/1471* (2013.01); *H04L 12/6418* (2013.01);
(Continued)

(58) Field of Classification Search
CPC .......................... H04M 2215/32; H04M 15/00
USPC ................... 455/406, 405, 414.1, 418, 422.1
See application file for complete search history.

(56) References Cited

U.S. PATENT DOCUMENTS

2003/0045267 A1 *  3/2003  Himmel et al. ............... 455/406
2003/0096591 A1    5/2003  Pohutsky et al.
(Continued)

FOREIGN PATENT DOCUMENTS

EP           1871084 A1    12/2007

*Primary Examiner* — Nghi H Ly
(74) *Attorney, Agent, or Firm* — Murphy, Bilak & Homiller, PLLC (57) ABSTRACT

A method of controlling use of electronic communication services in an electronic communications network (103), the method comprising: receiving (301) a first credit control request for usage quota from a system providing service (104) for an electronic communication service requested by a first subscriber (101-1); retrieving (302) subscriber account information for the first subscriber (101-1) to be charged for the requested service by a first charging device (105); determining (303a) based on the retrieved subscriber account information at least a second subscriber (102-1) to be charged for at least part of the requested service; determining (303c) a first hash of a rate plan for the first subscriber; setting (305a) a status to indicate that control of the subscriber account information of the first subscriber (101-1) is temporary transferred to the second charging device (106); sending (306) to the second charging device (106) a second credit control request for the electronic communication service (101-1; 102-1); receiving (307) from the second charging device (106):—modified subscriber account information of the first subscriber (101-1) including the requested usage quota; and sending (310) a credit response message including the usage quota to the requesting system providing service (104).

10 Claims, 7 Drawing Sheets

(51) Int. Cl.
*H04L 12/14* (2006.01)
*H04L 12/64* (2006.01)
*H04M 17/00* (2006.01)
*H04M 15/00* (2006.01)

(52) U.S. Cl.
CPC ......... *H04M 17/00* (2013.01); *H04M 2215/66* (2013.01); *H04M 15/07* (2013.01); *H04M 15/64* (2013.01); *H04M 15/83* (2013.01); *H04M 15/858* (2013.01)

(56) References Cited

U.S. PATENT DOCUMENTS

2008/0103992 A1    5/2008  Cai et al.
2009/0258630 A1*  10/2009  Purohit ......................... 455/406

\* cited by examiner

Rate Plane 1 (Voice)

Monthly cost €19
Voice 9c (per minute)
SMS 11c
MMS 59c
Video calls €1,49 (per minute)
Data GPRS/3G €1,49 (per MB)
* All prices are within HPLMN, Surf max 2 €
per 24h

Rate Plane 2 (Messaging)

Monthly cost €19
Voice 29c (per minute)
SMS Free
MMS 29c
Video calls €1,49 (per minute)
Data GPRS/3G €1,49 (per MB)
* All prices are within HPLMN, SMS
maximum 5000 per month, Surf max 2 €
per 24h

Rate Plane 3 (Data)

Monthly cost €19
Voice 29c (per minute)
SMS 11c
MMS 29c
Video calls €1,49 (per minute)
Data GPRS/3G Free
* All prices are within HPLMN, Surf max 10
GB

Add on Products

Family and Friends

Monthly cost €9.95
Voice Free
SMS Free
MMS Free
Video calls Free
* All prices are within HPLMN and
members, maximum of 10 members

Mobile Surf

Monthly cost €5.95
Data GPRS/3G Free
* All prices are within HPLMN

*FIG. 7*

METHOD, DEVICE AND COMPUTER PROGRAM PRODUCT FOR CONTROLLING USE OF ELECTRONIC COMMUNICATION SERVICES

TECHNICAL FIELD

The present invention relates generally to a method, device and computer program controlling use of electronic communication services in an electronic communications network.

BACKGROUND

An Online charging system (OCS) is a system allowing communication service providers of telecommunications networks (GSM, CDMA, WCDMA, etc.) to charge perpaid and postpaid subscribers, in real time, based on service usage. Charging transactions are made in real time, meaning that funds are reserved on a subscriber's account before a service is delivered and new funds may be reserved continuously. This ensures that services are only provided if there are funds to cover for them. Naturally OCS allows for a subscriber to have multiple communication sessions open simultaneously while maintaining control of the account balance. Support for customer interaction and notifications may be provided to make it easy for subscribers to keep continuous track of their spending. Hence, the combination of rating, cost determining unit and database may be referred as an Online Charging System (OCS).

Telecom operators are facing new demands on charging of real-time services in addition to existing charging and rating methods. A service, such as a phone call, is charged according the consumers rates and to the consumers account. According to another scenario a consumer rate plan is used in combination with a fund provider account. This could be a family account where the child has access to an account belonging to the parent but all the rating is done according to the child's rates. In another case a company has negotiated a special rate for all its employees but the employees has to pay for the calls them selves, i.e a fund provider rate plan is used while charging consumer accounts. According to a common scenario for companies is when a fund provider rate plan is used for charging the fund provider account. In this case, all charges done by an employee is charged according to the rates for the company and to the company account.

In large systems subscriber information is spread over several systems or centrally stored in a data base. To be able to perform operations on the data, it is in many cases necessary to transport the information from one system to another or from a data base to a system that will perform operations on it.

In charging and rating scenarios this is most obvious when one subscriber has access to another subscriber's information. This is used when one subscriber for instance has access to the possibility to let another subscriber take the charges for a call. In telecommunication and interne solutions the main protocol used for rating requests is Diameter. If the subscribers reside in the same database and is processed by the rating and cost determining unit it is not an issue, but if they are stored on different databases or are rated by separate rating processing units then one subscriber needs some manner to interact with the other.

Charging and rating scenarios when one subscriber has access to another subscriber's information may involve one or more consumers and fund providers. In this context, a consumer is an individual that may use a service and has an account, i.e a subscriber with an account. A fund provider is an individual or company that has an account that may be used by one or more consumers. A rate plan is a product that a consumer or fund provider must purchase in order to get access to any service, which may be a combination of a service class and tariff tree.

Telecom operators are facing new demands on charging of real-time services in addition to existing charging and rating methods. The most common case is when a service, such as a phone call, is charged according the consumers rates and to the consumers account. According to another scenario a consumer rate plan is used in combination with a fund provider account. This could be a family account where the child has access to an account belonging to the parent but all the rating is done according to the child's rates. In another case a company has negotiated a special rate for all its employees but the employees has to pay for the calls them selves, i.e a fund provider rate plan is used when charging consumer accounts. According to a common scenario for companies is when a fund provider rate plan is used for charging the fund provider account. In this case, all charges done by an employee is charged according to the rates for the company and to the company account.

A problem associated with requesting information from one Online Charging System (OCS) to another is that the information received will be limited by the functionality that can be provided by the protocol used and the frequency in the updates between the subscribers.

For example, a first subscriber has an account on a first OCS, but also the option to charge a second subscriber with an account on a second OCS for part or all of a service offered. If the first subscriber would send the request for charges over to the second OCS holding the second subscriber and if then the second subscriber only agreed to pay for a part, e.g. the first part of the charge, the request would have to be dropped back to first subscriber again. The first subscriber would then have to evaluate this further to check how the rest of the charge should be paid. It may come to the conclusion that it will take charge for a part of the charge, e.g the second part, but the rest is again to be handled by the second subscriber. If the service can be split into several parts that will be divided between the two subscribers this will be very protocol intensive, i.e a lot of subscriber information has to be transmitted back and forth between the first and second OCSs.

To meet these challenges an efficient shared charging and rating for service usage is desired.

SUMMARY

It is an object to overcome at least some of the above-mentioned disadvantages and to improve the method of controlling use of electronic communication services in an electronic communications network.

A first aspect of the present invention is a method of controlling use of electronic communication services in an electronic communications network. The method may comprise the steps of:

receiving a first credit control request for usage quota from a system providing service for an electronic communication service requested by a first subscriber;

retrieving subscriber account info nation for the first subscriber to be charged for the requested service by a first charging device;

determining based on the retrieved subscriber account information at least a second subscriber to be charged for at least part of the requested service;

determining a second charging device holding the second subscriber;

determining a first hash of a rate plan for the first subscriber;

setting a status to indicate that the control of the subscriber account information of the first subscriber is temporary transferred to the second charging device;

sending to the second charging device a second credit control request for the electronic communication service, said second credit control request including: the first credit control request for determining and reserving the resources required for the use of the electronic communication service, the account information of the first subscriber including the rate plan for the first subscriber;

receiving from the second charging device, modified subscriber account information of the first subscriber including reservations and/or deductions for the reservations made from the account, and the requested usage quota;

updating the subscriber account information of the first subscriber with the modified subscriber account information;

setting the status of the first subscriber indicating that the control of the subscriber account information is not temporary transferred to the second charging device; and sending a credit response message including the usage quota to the requesting system providing service for granting user access to the electronic communication.

In one or more embodiments the second charging request includes the first hash of the rate plan for the first subscriber.

In one or more embodiments the method further comprises, before the step of setting the status, the steps of:

checking current status of the first subscriber in the first charging device indicating whether control of the subscriber account information is temporary transferred to the second charging device; and if so, sending a credit response message to the requesting system providing service indicating that the first subscriber cannot be updated.

In one or more embodiments the method further comprises, before the step of setting the status, the steps of:

checking current status of the first subscriber in the first charging device indicating whether control of the subscriber account information is temporary transferred to the second charging device;

if so, queuing the first credit control request until the control of the subscriber account information is determined not to be temporary transferred to the second charging device.

In one or more embodiments the second credit control request includes a request for a second hash of the rate plan for the first subscriber; and the method may further comprise the steps of:

receiving from the second charging device, modified subscriber account information of the first subscriber, including the second hash of the rate plan for the first subscriber;

matching the first hash with the second hash of the rate plan for the first subscriber;

if the first hash and the second hash match, updating the subscriber account information of the first subscriber with the modified subscriber account information;

setting the status of the first subscriber indicating that the subscriber account information is not temporary transferred to the second charging device; and sending a credit response message to the requesting system providing service for granting user access to the electronic communication service with the reserved resources.

A second aspect of the present invention is a method of controlling use of electronic communication services in an electronic communications network. The method may comprise the steps of:

receiving from a first charging device a second credit control request for usage quota for electronic communication service, said request including a credit control request for determining and reserving the resources required for the use of the electronic communication service, the account information of the first subscriber including a rate plan for the first subscriber and a first hash of the rate plan for the first subscriber;

determining a second hash of the rate plan for the first subscriber;

comparing the first hash with the second hash of the rate plan for the first subscriber;

if the comparison of the first hash and the second hash match, determining and reserving, based on the rate plans for the first and second subscribers, the resources required for the requested electronic communication service; and sending modified subscriber account information including reservations and deductions for the reservations made from the account of the first subscriber and the requested usage quota to the first charging device.

A third aspect of the invention is a computer program comprising program instructions for causing a computer to perform the method according to any or all of the first, second and third aspects of the invention, when said program is run on a computer.

The computer program may be stored on a carrier and comprise computer executable instructions for causing a computer to perform the method according to the first aspect of the invention, when said program is run on a computer.

The above-mentioned carrier may be, but is not limited to, a record medium, computer memory, read-only memory or an electrical carrier signal.

A fourth aspect of the invention is a computer program product comprising a computer readable medium, having thereon: computer program code means, when said program is loaded, to make the computer execute the process according to any or all off the first, second or third aspects.

A fifth aspect of the invention is a charging device for controlling use of electronic communication services in an electronic communications network, comprising:

a communication interface adapted to receive a first credit control request from for usage quota a system providing service for an electronic communication service requested by a first subscriber;

a storage device adapted to store subscriber account information for the first subscriber and a status for the first subscriber indicating whether control of the subscriber account information is temporary moved to another charging device;

a processing unit adapted to:

retrieve from the storage devices subscriber account information for the first subscriber (101-1) to be charged for the requested service;

determine at least a second subscriber to be charged for at least part of the requested service based on the retrieved subscriber account information, another charging device holding the second subscriber, and a first hash of a rate plan for the first subscriber;

set a status to indicate that control of the subscriber account information is temporary transferred to the other charging device;

send a second credit control request for the electronic communication service, said second credit control request including the first credit control request for determining and reserving the resources required for the use of the electronic communication service, the account information of the first subscriber including the rate plan, to the other charging device;

receive from the other charging device through the communication interface modified subscriber account information including reservations and/or deductions for the reservations made from the account of the first subscriber and the requested usage quota;

update the subscriber account information of the first subscriber with the modified subscriber account information in the storage device;

set the status of the first subscriber to indicate that the control of the subscriber account information is not temporary transferred to the other charging device; and send a credit response message including the usage quota through the communication interface to the requesting system providing service for granting user access to the electronic communication service.

According to some embodiments, the control unit is further configured to check whether the current status of the first subscriber indicates that the control of the subscriber account information is temporary transferred to the other charging device, and if so, send a credit response message to the requesting system providing service indicating that the first subscriber cannot be updated.

According to some embodiments, the second credit control request may include a request for a second hash of the rate plan for the first subscriber; and the processing unit may further be adapted to:

receive through the communication device modified subscriber account information including the second hash from the other charging device;

match the first hash with a second hash of the rate plan for the first subscriber;

if the first hash and the second hash match, update the subscriber account information of the first subscriber with the modified subscriber account information;

set the status indicator for the first subscriber indicating that the subscriber account information is not temporary moved to the other charging device (106); and send a credit response message to the requesting system providing service for granting user access to the electronic communication service based on the reserved resources.

A sixth aspect of the invention is a charging device for controlling use of electronic communication services in an electronic communications network, comprising:

a communication interface adapted to receive from another charging device a second credit control request for an electronic communication service requested by a first subscriber, said request including a first credit control request for determining and reserving the resources required for the use of the electronic communication service, account information of the first subscriber including a rate plan for the first subscriber and a first hash of the rate plan for the first subscriber;

a processing unit adapted to:

determine a second hash of the rate plan for the first subscriber;

compare the first hash with the second hash;

provided that the first hash and the second hash match, determine and reserve based on the rate plans for the first and second subscribers the resources required for the requested electronic communication service; and send through the communication interface modified subscriber account information including reservations and deductions for the reservations made from the account of the first subscriber and the requested usage quota to the other charging device.

An advantage is that the systems holding the information of the subscriber have full control over the handling of the information.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a embodiments will be described in detail below, reference being made to the accompanying drawings, in which.

DETAILED DESCRIPTION

Embodiments of the invention will be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 1:
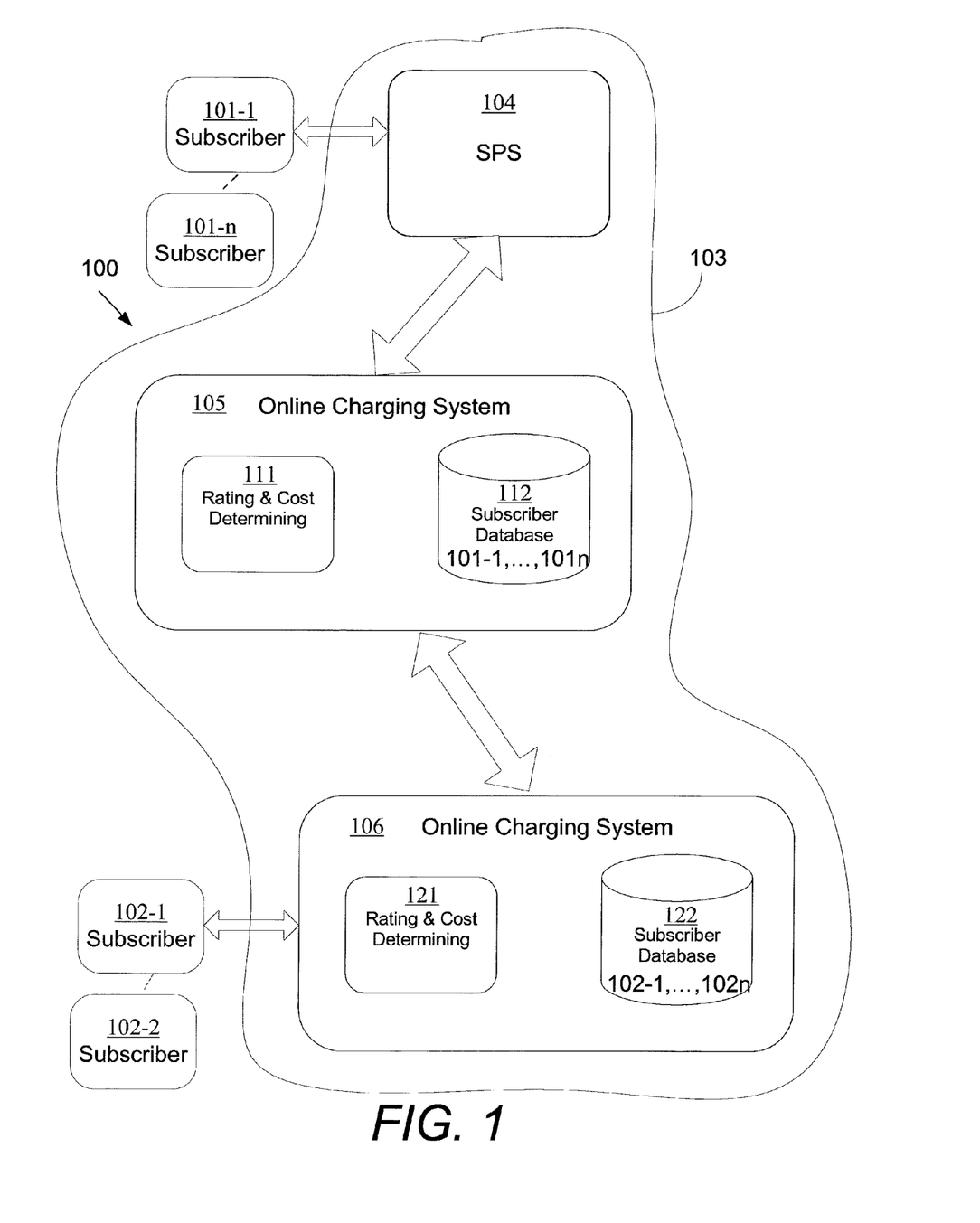
FIG. 1 illustrates a system providing resources to one or more subscribers for use of an electronic communication service according to an exemplary embodiment.

FIG. 1 is a block diagram illustrating an embodiment of a high level network or system 100 comprising network elements forming a network environment in which the inventive method, device(s), and computer program may be implemented and operate. The elements may be separate standalone network elements or arranged in groups of two or more elements.

The system 100 providing resources to one or more end users or subscribers 101-1 to 101-n, 102-1 to 102n for use of an electronic communication service or services. As shown in FIG. 1, the subscribers 101-1 to 101-n, 102-1 to 102n may be connected to a communications network 103. The communications network 103 may be a telecommunications network comprising links and nodes connected together to enable telecommunication between users of terminals, i.e the subscribers 101-1 to 101-n, 102-1 to 102n. The nodes may be, but are not limited to, a system providing service entity (SPS) 104 providing the network services to the subscribers and at least two online charging systems (OCSs) 105 and 106. The SPS 104 may determine which service the user/subscriber is requesting and that the user is authenticated and authorized to use the requested service. Moreover, the SPS 104 may determine which charging systems OCSs that should perform the rating for the user.

Each of end users 101-1 to 101-N may include a cellular radiotelephone, a personal digital assistant (PDA), a laptop or desktop computer, or any other type of device or appliance that includes a communication transceiver that permits the device to communicate with other devices.

Each of the online charging systems 105 and 106 may be charging devices including a server entity that performs credit-control associated with one or more network services. The online charging systems comprises means 111, 121 for perform the credit-control, i.e rating and cost determination, based on subscriber information about the end users 101-1, ..., 101-n, 102-1, ..., 102-n before a service event is delivered to one or more of end users 101-1, ..., 101-n, 102-1, ..., 102-n. The subscriber information may be stored in an end user or subscriber database 112,122 of the respective online charging system 105, 106.

Figure 2:
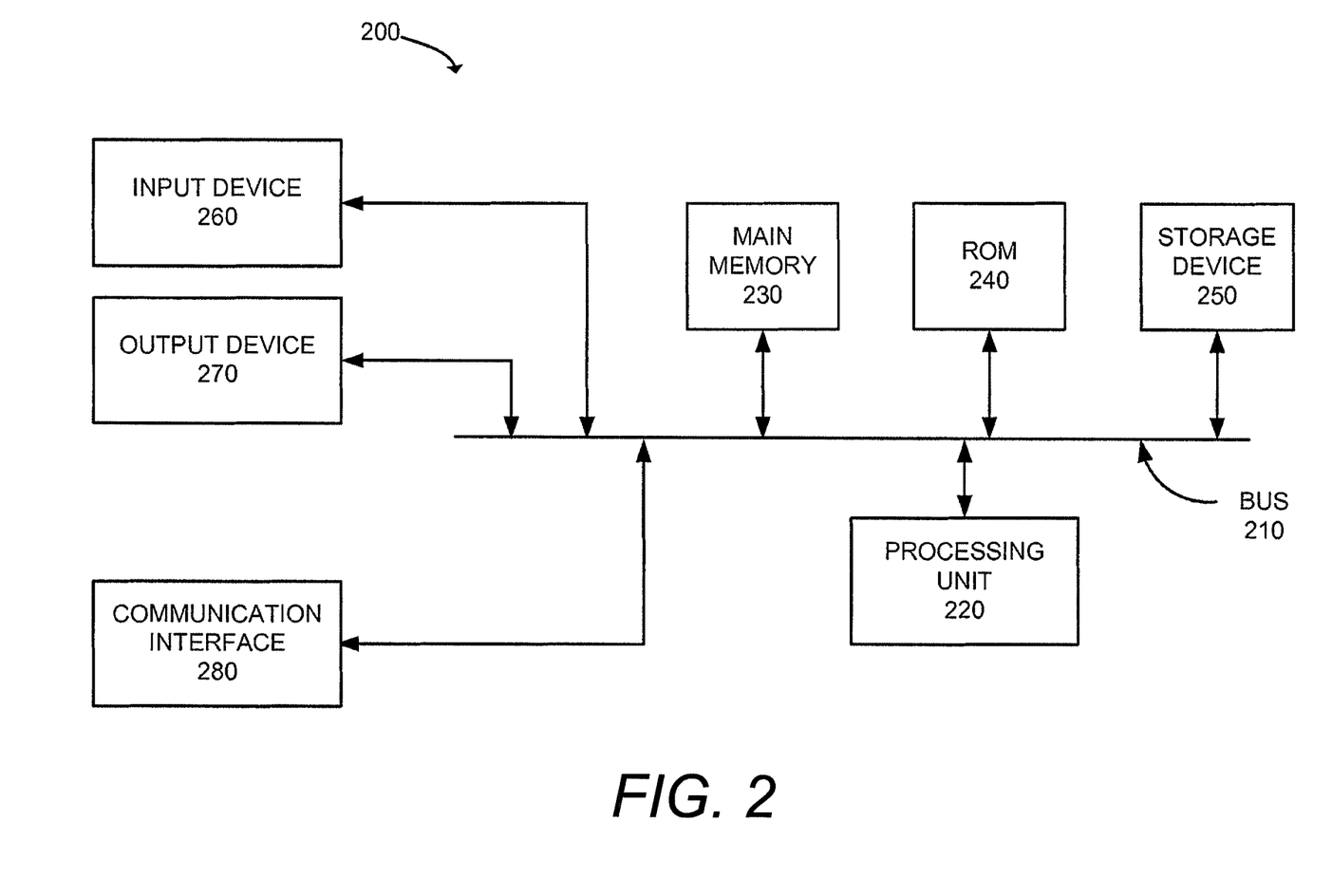
FIG. 2 illustrates an exemplary block diagram of a device that may correspond to a subscriber device, a system providing service or an online charging system of FIG. 1.

FIG. 2 is an exemplary block diagram of a device 200, which may correspond to one or more of the charging systems 105, 106. As illustrated, device 200 may include, but is not limited to, a bus 210, a processing unit 220, a main memory 230, a Read Only Memory (ROM) 240, a storage device 250, an input device 260, an output device 270, and a communication interface 280. Bus 210 may include a path that permits communication among the elements of the client/server entity.

Processing unit 220 may include a conventional processor, microprocessor, or processing logic that may interpret and execute instructions. Main memory 230 may include a random access memory (RAM) or another type of dynamic storage device that may store information and instructions for execution by processor 220. ROM 240 may include a conventional ROM device or another type of static storage device that may store static information and instructions for use by processing unit 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 103.

Device 200 may perform certain operations or processes described herein. Device 200 may perform these operations in response to processing unit 220 executing software instructions contained in a computer-readable medium, such as memory 230, ROM 240, and/or storage device 250. A computer-readable medium may be defined as a physical or logical memory device. Each of main memory 230, ROM 240 and storage device 250 may include computer-readable media. The magnetic and/or optical recording media (e.g., readable CDs or DVDs) of storage device 250 may also include computer-readable media.

The software instructions may be read into memory 230 from another computer-readable medium, such as storage device 250, or from another device via communication interface 280. The software instructions contained in memory 230 may cause processing unit 220 to perform operations or processes described herein. Alternatively, hardwired circuitry may be used in place of or in combination with software instructions to implement processes described herein. Thus, implementations described herein are not limited to any specific combination of hardware circuitry and software.

According to a first embodiment, the online charging system 105;200 is a first charging device adapted to control use of electronic communication services in the electronic communications network 103. The communication interface 280 is adapted to receive a credit control request for usage quota from the system providing service 104 for an electronic communication service requested by one of the subscribers, a first subscriber 101-1 in this example embodiment. The storage device 250 is adapted to store subscriber account information for the subscriber and a status, for example a status indicator, indicating whether the subscriber account information is temporary moved to another or second charging device, for example the charging system or device 106.

The processing unit 220 is adapted to retrieve from the storage device 250 subscriber account information for the subscriber 101-1 to be charged for the requested service and determine at least a second subscriber 102-1 to be charged for at least part of the requested service based on the retrieved subscriber account information, another online charging system, a second charging device 106 in this embodiment, holding the second subscriber 102-1, and a first hash of a rate plan and system configuration that may have an impact on the subscriber 101-1. The Processing unit 220 may be further adapted to set a status to indicate that control of the subscriber account information is temporary transferred to the second charging device 106. However, the processing unit 220 may also be configured to check whether the current status of the first subscriber 101-1 indicates that control of the subscriber account information is temporary transferred to the second charging device 106, and if so, send a credit response message to the requesting system providing service 104 indicating that the first subscriber 101-1 cannot be updated.

Further, the processing unit 220 is adapted to control that a request for the electronic communication service 101-1; 102-1 is sent through the communication interface 280 of the charging device 105;200, wherein the request may include a credit control request for determining and reserving the resources required for the use of the electronic communication service, the account information including the rate plan of the first subscriber 101-1, to the second charging device 106. The request may also include the hash of the rate plan of the first subscriber 101-1. The processing unit 220 may also be adapted to receive from the second charging device 106 through the communication interface 280 modified subscriber account information including reservations and/or deductions for the reservations made from the account of the first subscriber 101-1 and the requested usage quota.

In response to the received modified subscriber information and reserved resources, the processing unit 220 of the charging device 105;200 is adapted to update the subscriber account information of the first subscriber 101-1 with the modified subscriber account information in the storage device 250. The status of the first subscriber 101-1 may be set by the processing unit 220 to indicate that the control of the subscriber account information is not temporary transferred to the second charging device 106. The processing unit 220 is adapted to generate and send a credit response message including the usage quota through the communication interface 280 to the requesting system providing service 103 for granting user access for the subscriber 101-1 to the electronic communication service.

According to an alternative embodiment, the charging device 105;200 is adapted to control use of electronic communication services in the electronic communications network 103. The communication interface 280 is adapted to receive a credit control request for usage quota from the system providing service 104 for an electronic communication service requested by a first subscriber 101-1 and the storage device 250 is adapted to store subscriber account information for the first subscriber 101-1 to be charged for the requested service and a status indicator for the first subscriber indicating whether the control of the subscriber account information is temporary transferred to another charging device.

The processing unit 220 is adapted to retrieve subscriber account information for the first subscriber 101-1 to be charged for the requested service and determine at least a second subscriber 102-1 to be charged for at least part of the requested service based on the retrieved subscriber account information, and another charging device 106 holding the second subscriber 102-1. The status is set to indicate that control of the subscriber account information of the first subscriber 101-1 is temporary transferred to the second charging device 106.

According to this alternative embodiment, the processing unit 220 is adapted to send through the communication interface 280 a credit control request for the electronic communication service 101-1;102-1, wherein the request includes the credit control request for determining and reserving the resources required for the use of the electronic communication service, the account information of the first subscriber 101-1, and a request for a second hash of the rate plan for the first subscriber 101-1;102-1.

The processing device 220 may be adapted to receive through the communication device 280 modified subscriber account information including the determined and reserved resources and the second hash from the second charging device 106. Further, the processing device is adapted to compare the first hash with a second hash of the rate plan for the first subscriber 101-1, and if the first hash and the second hash match, update the subscriber account information of the first subscriber 101-1 with the modified subscriber account information.

The status indicator for the first subscriber may be set by the processing device 220 to indicate that the control of the subscriber account information of the first subscriber 101-1 is not temporary transferred to the second charging device 106.

The processing device 220 is adapted to generate and send a credit response message including the usage quota to the requesting system providing service 104 granting user access to the electronic communication service.

According to one embodiment of the charging device 106 the communication interface 280 adapted to receive from another charging device, for example the first charging device 105, a second credit control request for usage quota for electronic communication service 101-1, 102-1, an electronic communication service requested by the first subscriber an electronic communication service requested by the first subscriber 101-1, wherein said request including a credit control request for determining and reserving the resources required for the use of the electronic communication service, the account information of the first subscriber 101-1, a rate plan for the first subscriber 101-1 and a first hash of the rate plan for the first subscriber.

The processing unit 220 may be adapted to determine a second hash of the rate plan for the first subscriber 101-1, and compare the first hash with the second hash. Further, the processing unit 220 is adapted to, in response to that the first hash and the second hash match, determine and reserve, based on the rate plans for the first and second subscribers, the resources required for the requested electronic communication service. Modified subscriber account information including reservations and deductions for the reservations made from the account of the first subscriber are sent through the communication interface 280 to the other charging device 105.

Figure 3:
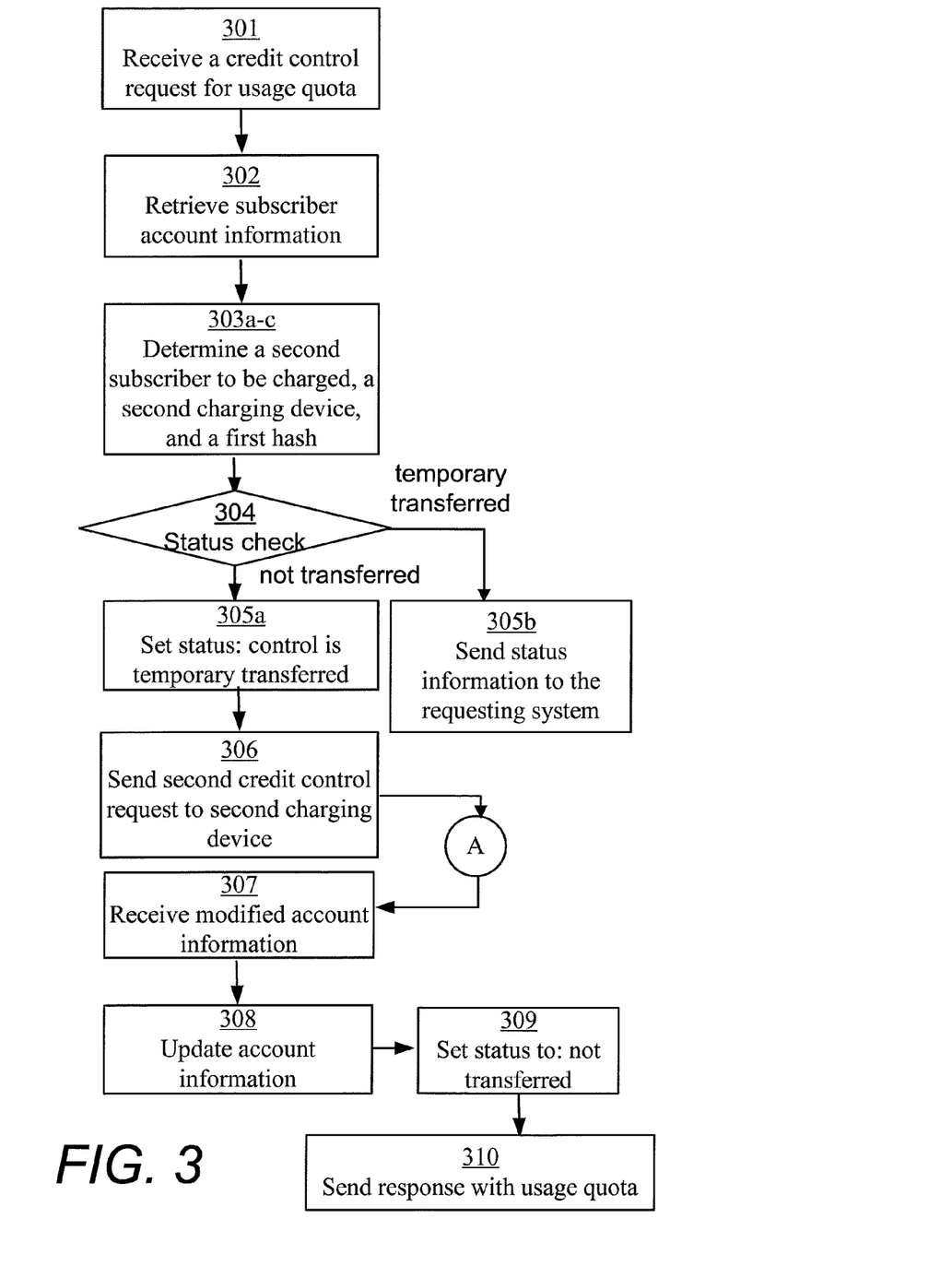
FIG. 3 shows a flowchart of a method of providing resources to one or more subscribers for use of an electronic communication service according to an exemplary embodiment.

One embodiment of a method of controlling use of electronic communication services in an electronic communications network will now be described with reference to FIGS. 3 and 4. In step 301 a credit control request is received by the online charging system 105 from the system providing service (SPS) 104 for an electronic communication service requested by the first subscriber 101-1.

Before sending the request, the SPS 104 determines which service the end user, i.e the first subscriber 101-1 in this embodiment, is requesting and that the end user is authenticated and authorized to use the service. The SPS 104 may also determine if a credit check is needed before the service can be provided to the requesting end user. Moreover the SPS may determine which online charging system (OCS), the first charging device 105 in this embodiment that should perform the rating for the end user.

In step 302, the first charging device 105 determines the subscriber account for the requesting end user, i.e subscriber 101-1, and retrieves the subscriber account information for the first subscriber 101-1 to be charged for the requested service. The subscriber account information may include, but is not limited to, subscriber specific settings, subscribed rate plan, and bought products/services for example but not limited to free SMS, a maximum per month for a particular amount, or unlimited MobileSurf at some bit rate for a particular amount.

In step 303, the first charging device 105 checks if there is another subscriber that also should pay for at least part of the service and which other online charging system that the other subscriber belongs to. There may also be other subscribers that should pay for other types of services e.g. voice, SMS, MMS. The first charging device 105 calculates the hash. However, the first charging device 105 may have calculated the hash in advance. For the calculation of the hash the rate plan and some of the first charging device 105 system configuration, such as how do the first charging device 105 determine a service. The hash is a unique way of describing the rate plan and system configuration that has an impact on the first subscriber 101-1. Hence, first charging device 105 determines in step 303a based on the retrieved subscriber account information at least a second subscriber 102-1 to be charged for at least part of the requested service, another online charging system in step 303b, i.e a second charging device 106 in this embodiment, holding the second subscriber 102-1, and a hash of the rate plan for the first subscriber 101-1 in step 303c.

The subscriber account information of the first subscriber 101-1 will be temporary transferred to the second charging device 106 and first charging device 105 sets a status to indicate that control of the first subscriber 101-1 is temporary transferred in step 305a. The status will tell any other requests that this subscriber is locked, i.e. cannot be updated on this system and that it is temporary transferred. The status may also provide information about to which online charging system the control of the first subscriber is temporary transferred, i.e. the second charging device 106 in this embodiment.

Before the step of setting the status, the first charging device 105 may check the current status of the first subscriber 101-1 in step 304 indicating whether the subscriber account information is temporary transferred to the second charging device 106. In case the status is set that the control of the first subscriber 101-1 is temporary transferred, a credit response message is sent in step 305b to the requesting system providing service 104 indicating that the first subscriber 101-1 cannot be updated.

A second credit control request for the electronic communication service 101-1;102-1 is sent to the second charging device 106 in step 306. The request may include the credit control request from the SPS 104 for determining and reserving the resources required for the use of the electronic communication service, the account information of the first subscriber 101-1 including the rate plan for the first subscriber 101-1, and the hash to the second charging device 106. Sending the rate plan as part of the request may imply sending the complete rate plan, part of the rate plan or a reference to the rate plan. The account information may include unique data of the first subscriber 101-1. The operation proceeds in the second charging device, which is indicated at A in FIG. 3.

Figure 4:
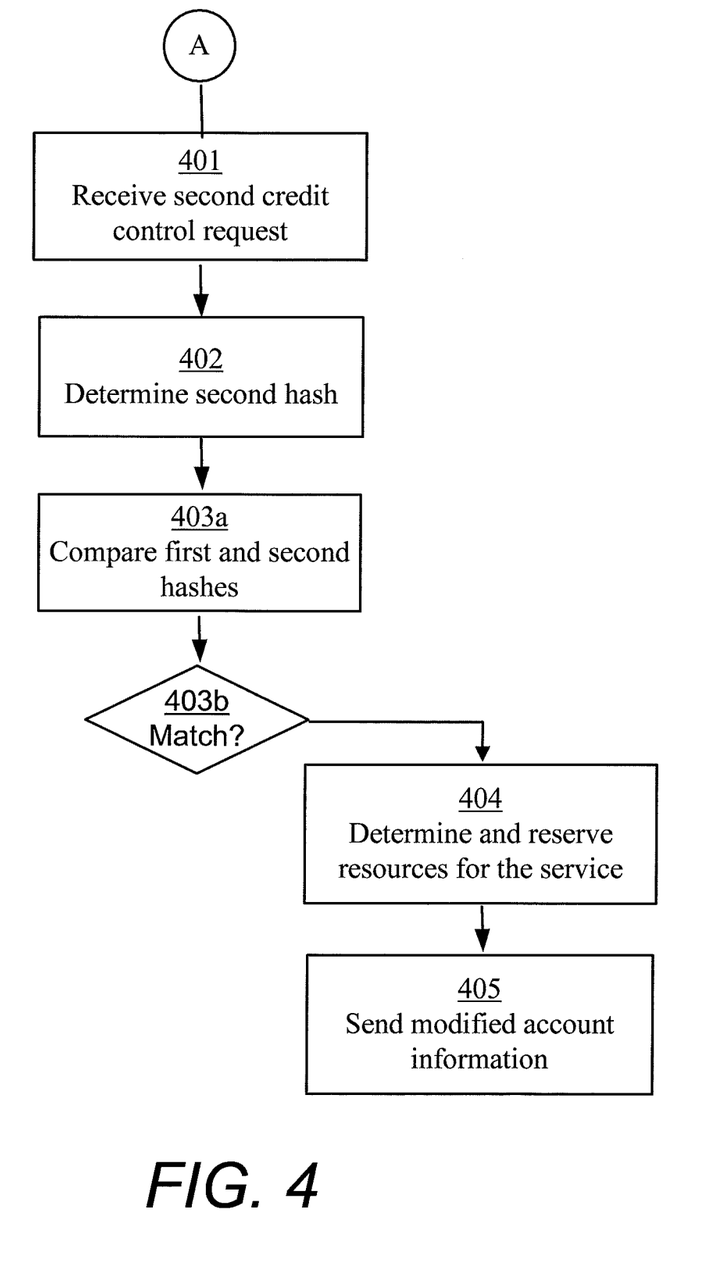
FIG. 4 shows a flowchart of a method of providing resources to one or more subscribers for use of an electronic communication service according to another embodiment.

Referring to the flowchart in FIG. 4, the request for usage quota for the electronic communication service 101-1;102-1 sent from the first charging device 105 is received by the second charging device 106 in step 401. The request includes the credit control request for determining and reserving the resources required for the use of the electronic communication service, the account information of the first subscriber 101-1 including the rate plan for the first subscriber 101-1 and the first hash of the rate plan for the first subscriber 101-1.

In step 402, a second hash of the rate plan and system configuration that matches the data received for first subscriber 101-1 is determined by the second charging device 106 and the first hash is compared with the second hash of the rate plan for the first subscriber 101-1 in step 403a.

If the comparison of the first hash and the second hash match in step 403b, the second charging server 106 rates the service and determines the funds to be deducted from both subscribers, i.e. both its own subscriber(s) and the subscriber of the first charging device 105, as well as how much funds that should be granted to SPS 104. The second charging device 106 may not only determine the resources that should be reserved from the first subscriber 101-1, but also reserve the funds on the first subscriber 101-1 since it is moved to the second charging device 106. Hence, the second charging device determines and reserves the resources required for the requested electronic communication service in step 404. The resources are determined based on the rate plans for the first and second subscribers 101-1;102-1, respectively.

Changes for the first subscriber 101-1, i.e modified subscriber account information including reservations and deductions for the reservations made from the account of the first subscriber including resources from the first subscriber 101-1 and the second subscriber 102-1 are sent to the first charging device 105 in step 405.

Referring again to FIG. 3, the first charging device 105 receives from the second charging device 106 modified subscriber account information of the first subscriber 101-1 including reservations and/or deductions for the reservations made from the account and the requested usage quota in step 307.

The subscriber account information of the first subscriber 101-1 is updated with the modified subscriber account information in step 308. In response to the received information the status of the first subscriber 101-1 is set in step 309 indicating that the control of the subscriber account information is not temporary transferred to the second charging device 106.

In step 310, a credit response message including the usage quota is sent from the first charging device 105 to the requesting system providing service 104 for granting user access to the electronic communication service.

Hence, the requesting system providing service 104 grants the end user, i.e subscriber 101-1 service based on the result of the credit check.

Figure 5:
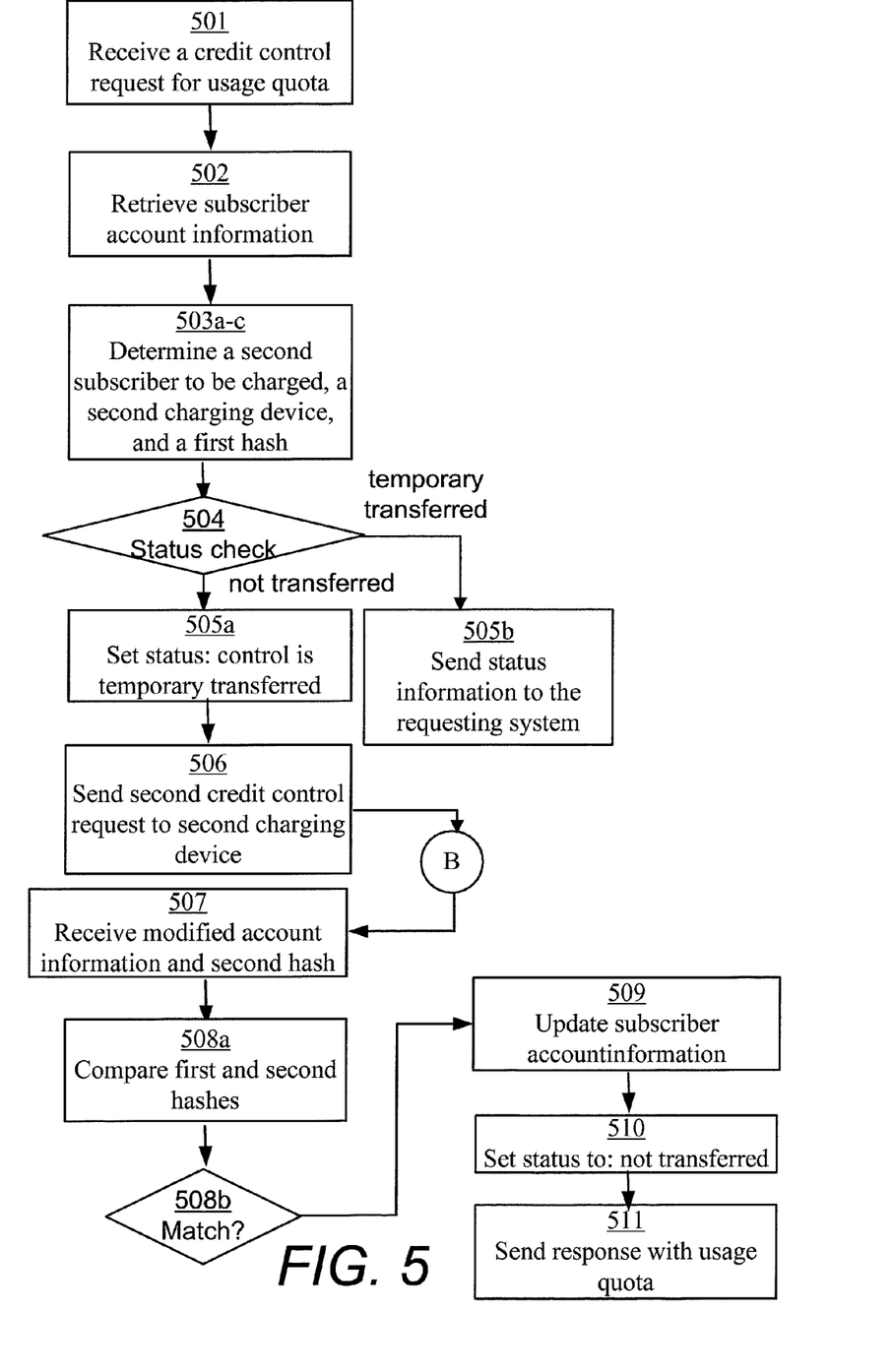
FIG. 5 shows a flowchart of a method of providing resources to one or more subscribers for use of an electronic communication service according to another embodiment.

An alternative embodiment of a method of controlling use of electronic communication services in an electronic communications network will now be described with reference to FIGS. 5 and 6. In step 501 a credit control request for usage quota is received by the online charging system 105 from the system providing service (SPS) 104 for an electronic communication service requested by the first subscriber 101-1.

Before sending the request, the SPS 104 determines which service the end user, i.e the first subscriber 101-1 in this embodiment, is requesting and that the end user is authenticated and authorized to use the service. The SPS 104 may also determine if a credit check is needed before the service can be provided to the requesting end user. Moreover the SPS may determine which online charging system (OCS), the first charging device 105 in this embodiment that should perform the rating for the end user.

In step 502, the first charging device 105 determines the subscriber account for the requesting end user, i.e subscriber 101-1, and retrieves the subscriber account information for the first subscriber 101-1 to be charged for the requested service. The subscriber account information may include, but is not limited to, subscriber specific settings, subscribed rate plan, and bought products/services, for example but not limited to free SMS, a maximum per month for a particular amount, or unlimited MobileSurf at some bit rate for a particular amount.

In step 503, the first charging device 105 determines based on the retrieved subscriber account information if there is another subscriber that also should pay for at least part of the service and which other online charging system that the other subscriber belongs to. There may also be other subscribers that should pay for other types of services e.g. voice, SMS, MMS. The first charging device 105 calculates the hash. However, the first charging device 105 may have calculated the hash in advance. For the calculation of the hash the rate plan and some of the first charging device 105 system configuration, such as how do the first charging device 105 determine a service. Hence, first charging device 105 determines at least a second subscriber 102-1 to be charged for at least part of the requested service, another online charging system, i.e a second charging device 106 in this embodiment, holding the second subscriber 102-1, and a hash of the rate plan for the first subscriber 101-1.

The control of the subscriber account information of the first subscriber 101-1 will be temporary transferred to the second charging device 106 and first charging device 105 sets a status of the first subscriber 101-1 to be temporary transferred in step 505a. The status will tell any other requests that this subscriber is locked, i.e. cannot be updated on this system and that it is temporary moved. The status may also provide information about to which online charging system the control of the first subscriber is temporary transferred, i.e. the second charging device 106 in this embodiment.

Before the step of setting the status, the first charging device 105 may check the current status of the first subscriber 101-1 in step 504 indicating whether the control of the subscriber account information is temporary transferred to the second charging device 106. In case the status is set that the first subscriber 101-1 is temporary transferred, a credit response message is sent in step 505b to the requesting system providing service 104 indicating that the first subscriber 101-1 cannot be updated.

A second credit control request for the electronic communication service 101-1;102-1 is sent to the second charging device 106 in step 506. The request may include the credit control request from the SPS 104 for determining and reserving the resources required for the use of the electronic communication service, the account information of the first subscriber 101-1 including the rate plan for the first subscriber 101-1, and a request for a hash of the first subscriber 101-1 to the second charging device 106. The account information may include unique data of the first subscriber 101-1.

Figure 6:
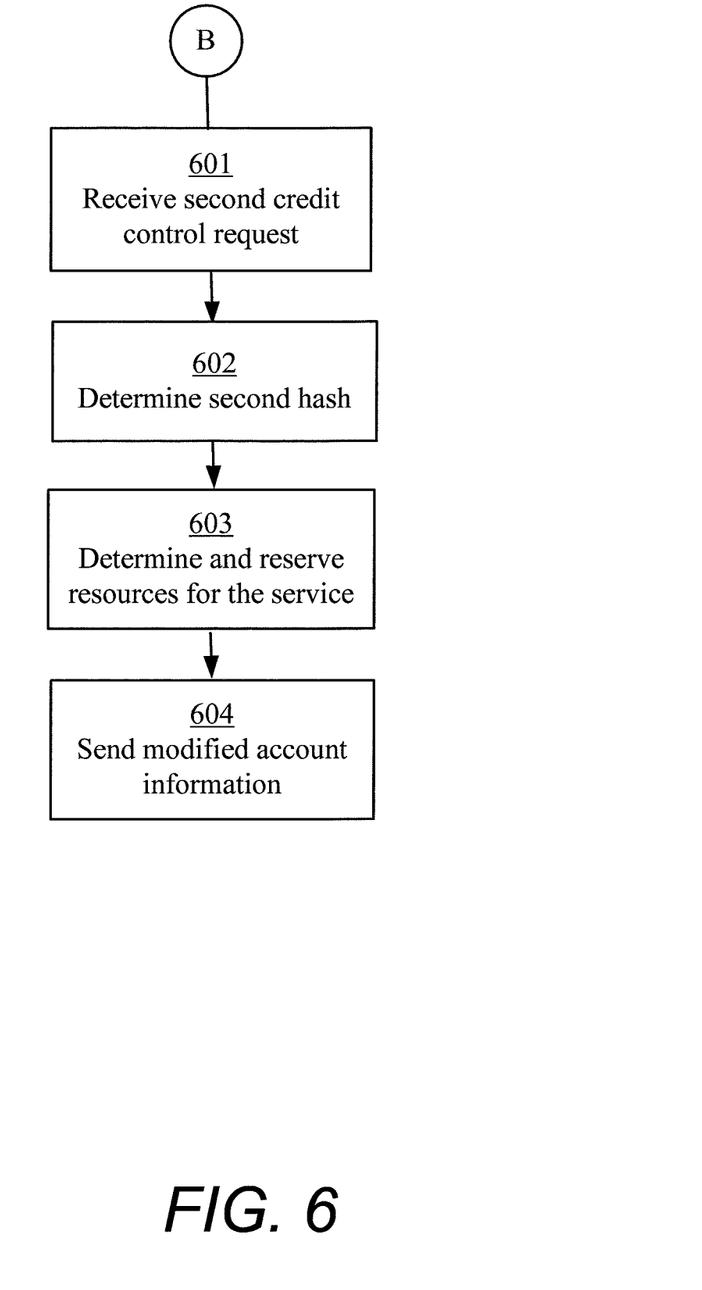
FIG. 6 shows a flowchart of a method of providing resources to one or more subscribers for use of an electronic communication service according to another embodiment.
Figure 7:
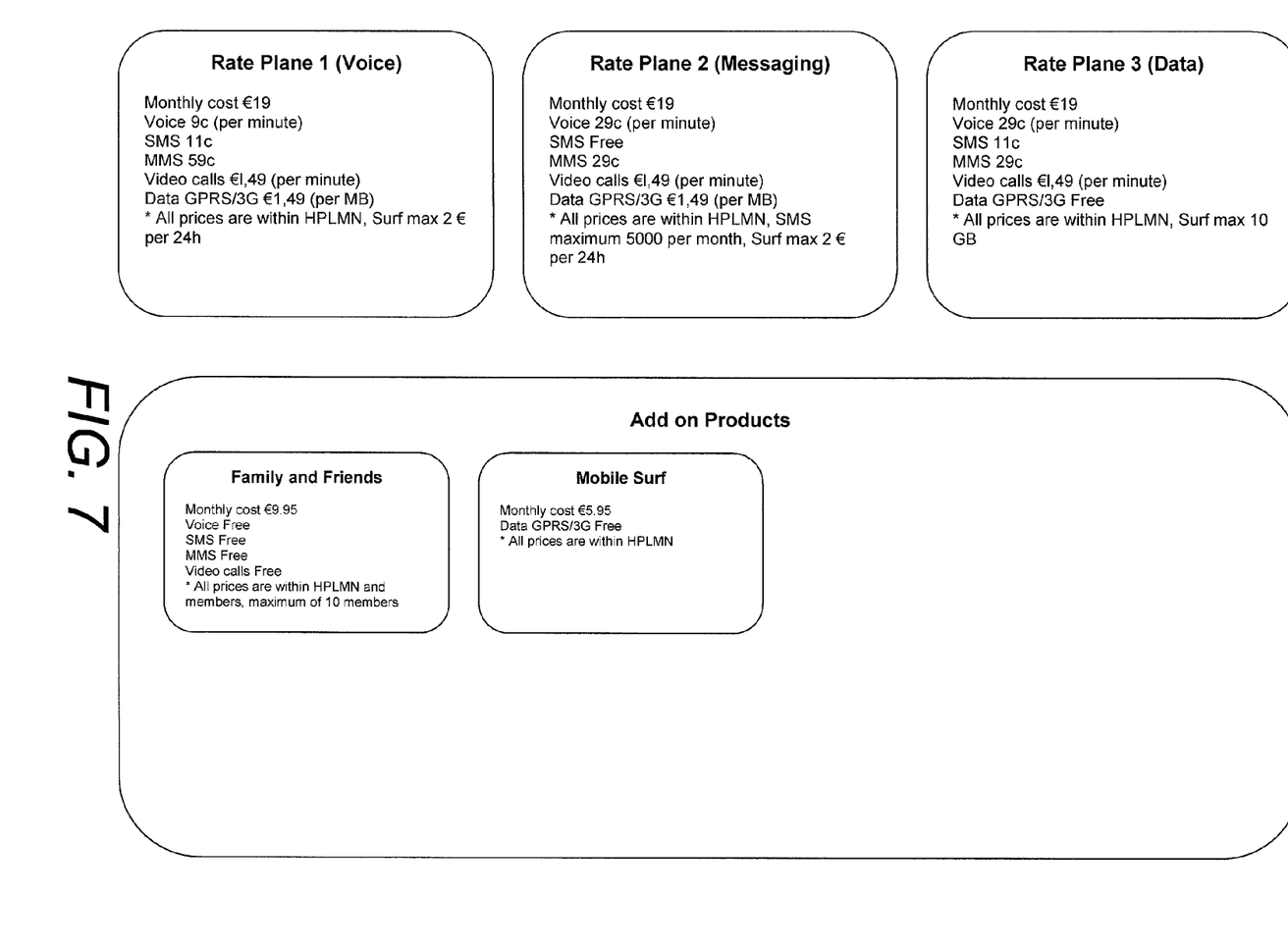
FIG. 7 illustrates a rate plan.

Referring to the flowchart in FIG. 6, the second credit control request for the electronic communication service 101-1;102-1 sent from the first charging device 105 is received by the second charging device 106 in step 601. The request includes the credit control request for determining and reserving the resources required for the use of the electronic communication service, the account information of the first subscriber 101-1 with the rate plan for the first subscriber 101-1 and the request for at hash of the rate plan for the first subscriber 101-1.

In step 602, a second hash of the rate plan and system configuration that matches the data received for first subscriber 101-1 is calculated by the second charging device 106.

The second charging server 106 rates the service and determines the funds to be deducted from both subscribers, i.e. both its own subscriber(s) and the subscriber of the first charging device 105, as well as how much funds that should be granted to SPS 104. The second charging device 106 may not only determine the resources that should be reserved from the first subscriber 101-1, but also reserve the funds on the first subscriber 101-1 since it is moved to the second charging device 106. Hence, the second charging device determines and reserves the resources required for the requested electronic communication service in step 603. The resources are determined based on the rate plans for the first and second subscribers 101-1;102-1, respectively.

Changes for the first subscriber 101-1, i.e modified subscriber account information of the first subscriber including resources from the first subscriber 101-1 and the second subscriber 102-1 are sent to the first charging device 105 in step 604.

Referring again to FIG. 5, the first charging device 105 receives from the second charging device 106 modified subscriber account information of the first subscriber 101-1 and resources reserved from the first subscriber 101-1 and the second subscriber 102-1, and the second hash of the first subscriber in step 507.

In step 508a, the first hash is compared with a second hash of the rate plan for the second subscriber (101-1). If the comparison of the first hash and the second hash match in step 508b, the subscriber account information of the first subscriber 101-1 is updated with the modified subscriber account information in step 509;

In response to the received information, the status of the first subscriber 101-1 is set in step 510 to indicating that the subscriber account information is not temporary transferred to the second charging device 106

In step 511, a credit response message is sent from the first charging device 105 to the requesting system providing service 104 for granting user access to the electronic communication service with the reserved resources.

Hence, the requesting system providing service 104 grants the end user, i.e subscriber 101-1 service based on the result of the credit check.

The present invention may be embodied as a method, device, system or computer program product. Accordingly, the present invention may take the form of an entirely hardware embodiment, a software embodiment or an embodiment combining software and hardware aspects all generally referred to herein as a unit, component or device. Furthermore, the present invention may take the form of a computer program product. The computer program product may be stored on a computer-usable storage medium having computer-usable program code embodied in the medium. Although the embodiments of the invention described with reference to the drawings comprise a computer apparatus and processes performed in the computer apparatus, the invention also extends to programs on or in a carrier, adapted for putting the invention into practice when the computer program is executed. The program may be in the form of source code, object code a code suitable for use in the implementation of the method according to the invention. The carrier can be any entity or device capable of carrying the program. For example the carrier may be a record medium, computer memory, read-only memory or an electrical carrier signal. Embodiments according to the invention may be carried out when the computer program product is loaded and run in a system having computer capabilities.

Any suitable computer readable medium may be utilized including hard disks, CD-ROMs, a RAM (Random Access Memory), a ROM (Read Only Memory), a flash memory, optical storage devices, a transmission media such as those supporting the Internet or an intranet, or magnetic storage devices.

Embodiments of the present invention have been described herein with reference to flowchart and/or block diagrams. It will be understood that some or all of the illustrated blocks may be implemented by computer program instructions. These computer program instructions may be provided to a processor of a general purpose computer, special purpose computer, or other programmable data processing apparatus to produce a machine, such that the instructions when executed create means for implementing the functions/acts specified in the flowchart otherwise described.

It is to be understood that the functions/acts noted in the flowchart may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A computer program product may comprise computer program code portions for executing the method, as described in the description and the claims, for providing control data when the computer program code portions are run by an electronic device having computer capabilities.

A computer readable medium having stored thereon a computer program product may comprise computer program code portions for executing the method, as described in the description and the claims, for providing control data when the computer program code portions are run by an electronic device having computer capabilities.

A computer program product may comprise computer program code portions for executing the method, as described in the description and the claims, for requesting control data when the computer program code portions are run by an electronic device having computer capabilities.

A computer readable medium having stored thereon a computer program product may comprise computer program code portions for executing the method, as described in the description and the claims, for requesting control data when the computer program code portions are run by an electronic device having computer capabilities.

The many features and advantages of the invention are apparent from the detailed specification, and thus, it is intended by the appended claims to cover all such features and advantages of the invention, which fall within the scope of the invention. However, although embodiments of the method and apparatus of the invention has been illustrated in the accompanying drawings and described in the foregoing detailed description, the disclosure is illustrative only and changes, modifications and substitutions may be made without departing from the scope of the invention as set forth and defined by the following claims.

The invention claimed is:

1. A method of controlling use of electronic communication services in an electronic communications network, the method comprising:
receiving a first credit control request for usage quota from a system providing service for an electronic communication service requested by a first subscriber;
retrieving subscriber account information for the first subscriber to be charged for the requested service by a first charging device;
determining based on the retrieved subscriber account information at least a second subscriber to be charged for at least part of the requested service;
determining a second charging device holding the second subscriber;
determining a first hash of a rate plan for the first subscriber;
setting a status to indicate that control of the subscriber account information of the first subscriber is temporarily transferred to the second charging device;
sending to the second charging device a second credit control request for the electronic communication service, said second credit control request including:
the first credit control request for determining and reserving the resources required for the use of the electronic communication service,
the account information of the first subscriber including the rate plan for the first subscriber;
receiving from the second charging device:
modified subscriber account information of the first subscriber including reservations and/or deductions for the reservations made from the account, and
the requested usage quota;
updating the subscriber account information of the first subscriber with the modified subscriber account information;
setting the status of the first subscriber indicating that the control of the subscriber account information is not temporarily transferred to the second charging device; and
sending a credit response message including the usage quota to the requesting system providing service for granting user access to the electronic communication.

2. The method of claim 1, wherein the second charging request includes the first hash of the rate plan for the first subscriber.

3. The method of claim 1, wherein the second credit control request includes a request for a second hash of the rate plan for the first subscriber; and the method further comprises:
receiving from the second charging device, the modified subscriber account information of the first subscriber, including the second hash of the rate plan for the first subscriber;
matching the first hash with the second hash of the rate plan for the first subscriber;
if the first hash and the second hash match, updating the subscriber account information of the first subscriber with the modified subscriber account information;
setting the status of the first subscriber indicating that the control of the subscriber account information is not temporarily transferred to the second charging device; and
sending a credit response message to the requesting system, the credit response message granting user access to the electronic communication service with the reserved resources.

4. The method of claim 1, further comprising, before setting the status of the first subscriber:
checking a current status of the first subscriber in the first charging device indicating whether control of the subscriber account information is temporarily transferred to the second charging device; and,
if so, sending a credit response message to the requesting system, the credit response message indicating that the first subscriber cannot be updated.

5. The method of claim 1, further comprising, before setting the status of the first subscriber:
checking a current status of the first subscriber in the first charging device indicating whether control of the subscriber account information is temporarily transferred to the second charging device;
if so, queuing the first credit control request until the control of the subscriber account information is determined not to be temporarily transferred to the second charging device.

6. A non-transitory computer-readable medium comprising a computer program stored thereupon, said computer program comprising program instructions that, when executed by a computer, cause the computer to:
receive a first credit control request for usage quota from a system providing service for an electronic communication service requested by a first subscriber;
retrieve subscriber account information for the first subscriber to be charged for the requested service by a first charging device;
determine, based on the retrieved subscriber account information, at least a second subscriber to be charged for at least part of the requested service;
determine a second charging device holding the second subscriber;
determine a first hash of a rate plan for the first subscriber;
set a status to indicate that control of the subscriber account information of the first subscriber is temporarily transferred to the second charging device;
send to the second charging device a second credit control request for the electronic communication service, said second credit control request including:
the first credit control request for determining and reserving the resources required for the use of the electronic communication service, and
the account information of the first subscriber including the rate plan for the first subscriber;
receive from the second charging device:
modified subscriber account information of the first subscriber including reservations and/or deductions for the reservations made from the account, and
the requested usage quota;

update the subscriber account information of the first subscriber with the modified subscriber account information;

set the status of the first subscriber indicating that the control of the subscriber account information is not temporarily transferred to the second charging device; and send a credit response message including the usage quota to the requesting system providing service for granting user access to the electronic communication.

7. A charging device for controlling use of electronic communication services in an electronic communications network, the charging device comprising:

a communication interface adapted to receive a first credit control request for usage quota from a system providing service for an electronic communication service requested by a first subscriber;

a storage device adapted to store subscriber account information for the first subscriber and a status for the first subscriber indicating whether the control of the subscriber account information is temporarily transferred to another charging device; and a processing unit adapted to:

retrieve, from the storage device, subscriber account information for the first subscriber to be charged for the requested service;

determine at least a second subscriber to be charged for at least part of the requested service based on the retrieved subscriber account information, another charging device holding the second subscriber, and a first hash of a rate plan for the first subscriber;

set a status to indicate that control of the subscriber account information is temporarily transferred to the other charging device;

send a second credit control request for the electronic communication service, said second credit control request including the first credit control request for determining and reserving the resources required for the use of the electronic communication service, the account information of the first subscriber including the rate plan, to the other charging device;

receive from the other charging device, through the communication interface, modified subscriber account information including reservations, or deductions for the reservations made from the account of the first subscriber, or both, and the requested usage quota;

update the subscriber account information of the first subscriber with the modified subscriber account information in the storage device;

set the status of the first subscriber to indicate that the control of the subscriber account information is not temporarily transferred to the other charging device; and send a credit response message including the usage quota through the communication interface to the requesting system providing service for granting user access to the electronic communication services.

8. The charging device of claim 7, wherein the second charging request includes the hash of the rate plan for the first subscriber.

9. The charging device of claim 7, wherein the processing unit is further configured to check whether the current status of the first subscriber indicates that the control of the subscriber account information is temporarily transferred to the other charging device, and if so, send a credit response message to the requesting system providing service indicating that the first subscriber cannot be updated.

10. The charging device of claim 7, wherein the second credit control request includes a request for a second hash of the rate plan for the first subscriber; and the processing unit is further adapted to:

receive, through the communication interface, the modified subscriber account information including the second hash from the other charging device;

compare the first hash with the second hash of the rate plan for the first subscriber;

if the first hash and the second hash match, update the subscriber account information of the first subscriber with the modified subscriber account information;

set the status indicator for the first subscriber indicating that the control of the subscriber account information is not temporarily transferred to the other charging device; and send a credit response message to the requesting system providing service for granting user access to the electronic communication service based on the reserved resources.

* * * * *